United States Patent [19]
Bowen et al.

[11] Patent Number: 5,175,782
[45] Date of Patent: Dec. 29, 1992

[54] OPTICAL FIBER COUPLER OF IMPROVED SIGNAL DISTRIBUTION CHARACTERISTICS

[75] Inventors: Terry P. Bowen, Etters; Dale D. Murray, Mount Joy; Paul R. Reitz, Palmyra, all of Pa.

[73] Assignee: AMP Incorporated, Harrisburg, Pa.

[21] Appl. No.: 614,539

[22] Filed: Nov. 16, 1990

[51] Int. Cl.⁵ ............................................ G02B 6/26
[52] U.S. Cl. ................................. 385/51; 385/46; 385/43
[58] Field of Search ............... 350/96.15, 96.16, 96.14, 350/96.21, 96.22; 385/39, 43, 46, 51, 54, 56, 59, 42

[56] References Cited

U.S. PATENT DOCUMENTS

| | | |
|---|---|---|
| 3,917,383 | 11/1975 | Cook et al. .................. 350/96.22 |
| 4,203,650 | 5/1980 | Millet et al. .................. 350/96.21 |
| 4,291,940 | 9/1981 | Kawasaki et al. ............. 350/96.15 |
| 4,330,170 | 5/1982 | Johnson et al. ............... 350/96.16 |
| 4,355,863 | 10/1982 | Aulich et al. .................. 385/46 X |
| 4,439,221 | 3/1984 | Smyth et al. .................. 65/4.21 |
| 4,449,781 | 5/1984 | Lightstone et al. ........... 350/96.15 |
| 4,591,372 | 5/1986 | Bricheno et al. ............. 65/4.2 |
| 4,653,845 | 3/1987 | Tremblay et al. ............ 350/96.15 X |
| 4,709,981 | 12/1987 | Mori ........................... 350/96.22 X |
| 4,915,469 | 4/1990 | Byron et al. ................. 350/96.15 X |

OTHER PUBLICATIONS

D. Mortimore and J. Arkwright, "Monolithic Wavelengths Flattened 1×7 Single-Mode Fused Coupler".

Primary Examiner—John D. Lee
Assistant Examiner—Phan T. Heartney

[57] ABSTRACT

A coupler (2,3) comprises, a central single mode optical fiber (5) and N number of glass fibers (4), having radii of equal dimensions, fused together along biconic tapered sections (13, 13) to couple optical power from the central fiber (5) completely and uniformly to only the fibers (4) that have optical cores (6).

16 Claims, 3 Drawing Sheets

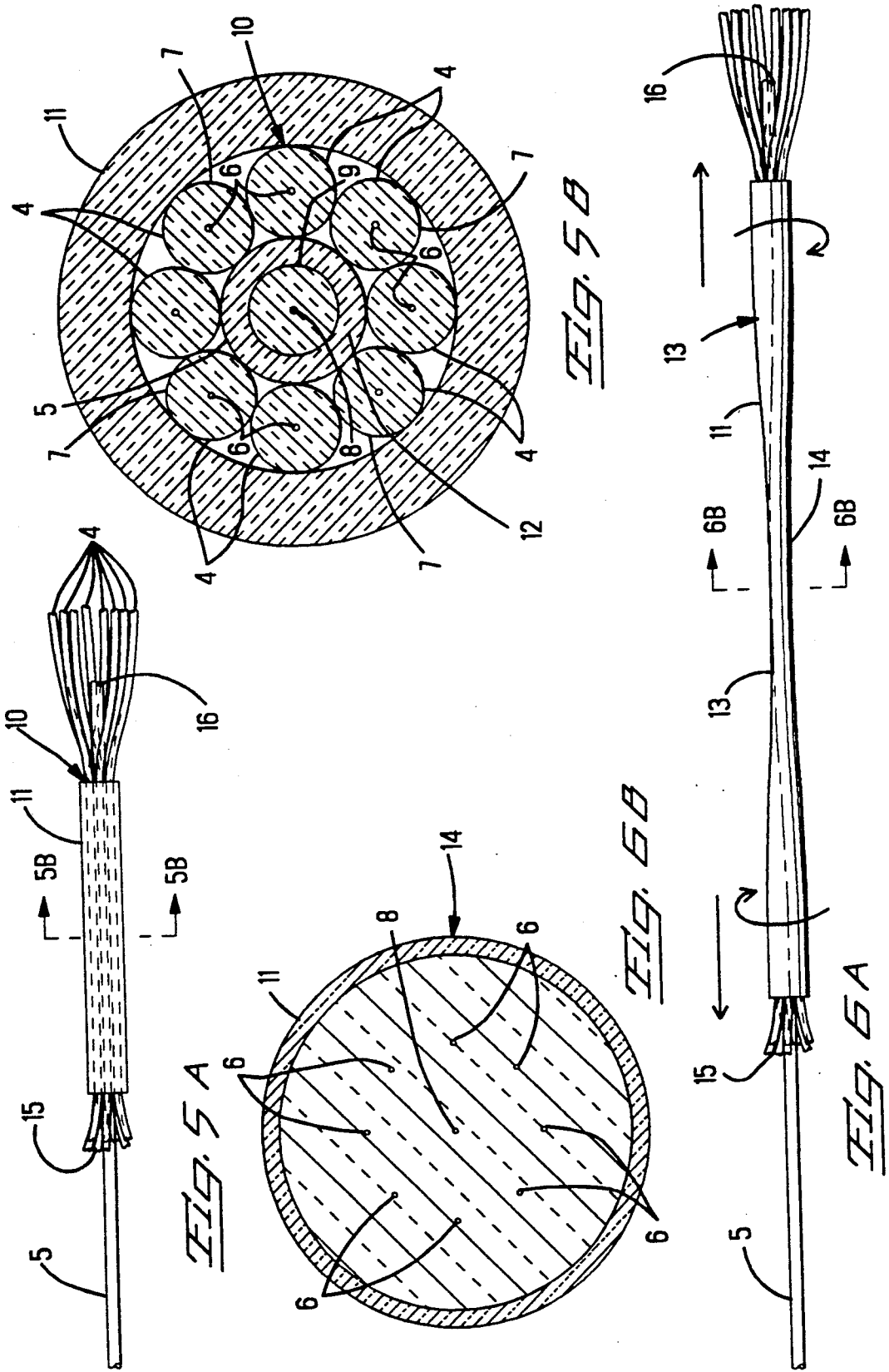

OPTICAL FIBER COUPLER OF IMPROVED SIGNAL DISTRIBUTION CHARACTERISTICS

FIELD OF THE INVENTION

The present invention relates to an optical fiber coupler, to a method for making such a coupler, and to a packed array of optical fibers useful for producing such a coupler.

BACKGROUND OF THE INVENTION

Single mode, optical fiber couplers are useful as signal distributors in multiple terminal systems such as those for bringing wideband services to consumers. One scheme for delivering such services involves telephone over passive networks, TPON, and an associated broadband version called BPON which serves up to 128 private users using a 20 Megabyte per second, Mb/s, time division multiplexed arrangement.

A known effective construction of a coupler involves two single mode fibers which are drawn and fused to form a twin fiber, biconical taper structure. One method of making such an optical fiber coupler comprises, first positioning a fiber bundle in a predetermined orientation and applying a tensile load to at least one of the fibers. At the same time, heat is applied to soften the fibers. The application of a tensile load causes necking down of each fiber into biconical shaped sections which fuse together because the fibers are softened. Fusing together of the biconical sections may be enhanced by twisting them while they are in a softened condition. As a further enhancement, the cladding of each fiber at the intended biconical section may be etched to a predetermined thickness prior to drawing and fusing.

According to another method, the fibers may be contained within a glass tube so as to promote intimate contact among biconical sections during fusion. The glass tube can comprise a quartz tube formed of complementary semicylindrical sections which are glued or fused together around the fiber bundles.

Receivers in a multiple terminal distribution system accommodate a particular power range, and respond poorly to signals either above or below the power range. A coupler for use in such a distribution system must couple output power uniformly in all outputs, for all outputs to attain output power within a prescribed power range. According to a publication, D. B. Mortimore and J. W. Arkwright, "Monolithic Wavelength-Flattened 1×7 Single-Mode Fused Coupler", Electron. Lett. 25, 606-607 (1989), have reported the fabrication of 1×7 single mode fused couplers by a method wherein 7 standard single-mode fibers are inserted into a capillary tube of Vycor, a trademark of Corning Incorporated, Corning N.Y. The fibers are arranged in a packed matrix structure with six output fibers surrounding a central fiber. The fibers are heated and tapered using standard, fused coupler fabrication equipment. During the heating and tapering process, optical power is launched into the central fiber, and the coupled power is monitored in each output fiber to achieve equal coupling of 14.3% to each output port. The Mortimore and Arkwright paper concludes that to obtain a wavelength flattened device, having equal power coupling, it is essential to control the degree of fusion of the coupler structure.

SUMMARY OF THE INVENTION

The present invention relates to a coupler of improved controlled fusion and achieving total power coupled from an input optical fiber uniformly to multiple output optical fibers. The coupler of the present invention is based on a controlled geometry of the coupler structure and results in a stronger, better protected, structure. An intimately packed together array, comprising multiple output fibers around an input central fiber, assures void free, fusion of softened, tapered sections of the fibers. The intimately packed array is achieved by providing the central, input fiber with a particular geometry relative to the geometries of the surrounding fibers.

The coupler of the present invention comprises, a central optical fiber and N number of glass fibers of equal radius, with all the fibers being fused together and coupled optically along a fused coupling length, said coupling length corresponding to that length along which optical power transmitted by the central fiber is coupled completely and distributed uniformly from the central fiber to output fibers of the N number of fibers having corresponding optical cores, and said coupling length being shorter than such a length of optical coupling along which the optical power is coupled, in return, to the central fiber.

According to the present invention, the radius "R" of the central fiber is critical to obtain compaction of the packed array of coupled taper sections characterized by equal power to output ports. The radius "R", of the central fiber is a function of the number N and of the radius "r" in common with the surrounding N optical fibers. The radius R of the central fiber is determined by:

$$R = (r)(1 - \sin\theta/\sin\theta,$$

where $\theta$ is 360°/2N.

The invention further resides in the use of a tube, which encompasses the outer fibers to retain them in a packed array with the central optical fiber, and which is tapered and fused with the tapered sections of the output fibers and of the central optical fiber.

According to the invention, the conventional, outer optical fibers include corresponding cores surrounded by cladding. The cores function to channel the optical outputs of the coupler. The number of cores equals the number of outputs of the coupler. Thus, by substituting an coreless glass fiber, of a conventional radius dimension, for a conventional optical fiber with a core, the number of outputs of the coupler is reduced by one.

For example, a 1×4 coupler, having one input fiber and four output fibers, is constructed with a central optical fiber, providing one input port, and four conventional optical fibers having corresponding cores, providing four output ports, and four coreless glass fibers without ability to channel the output of the coupler, but providing good control during drawing and fusing along a coupling length of the fibers 4, and 5 to achieve complete and uniform coupling of the fiber 5 with the cores corresponding to four of the eight fibers 4.

Additionally, the invention relates to a packed array of optical fibers for producing an optical coupler of improved signal distributing characteristics. The packed array comprises a central, single mode optical fiber of radius "R" encircled by N number of glass fibers of equal radius "r" packed together along a common length, and wherein one or more of the N number of glass fibers is without a corresponding core, and each of other N number of glass fibers includes a corresponding core providing an optical output.

In the array, a glass tube encircles the outer glass fibers along at least the common length. The central fiber alone, or within a glass sleeve has a radius "R" determined by: $R = (r)(1 - \sin \theta / \sin \theta)$, where $\theta$ is $360°/2N$.

For an understanding of the invention, reference will now be made by way of example to a detailed description taken in conjunction with accompanying drawings.

BRIEF DESCRIPTION OF THE DRAWINGS

According the drawings.

FIG. 5A is a schematic illustration of a packed array of glass fibers with an encompassing tube.

FIG. 5B is a section view taken along a line 5B—5B of FIG. 5A.

FIG. 6A is a schematic view of a coupler comprising an array of optical fibers with biconical taper sections fused together and fused with a glass tube.

FIG. 6B is a section view taken along the line 6B—6B of 6A.

DETAILED DESCRIPTION

Figures 1, 2:
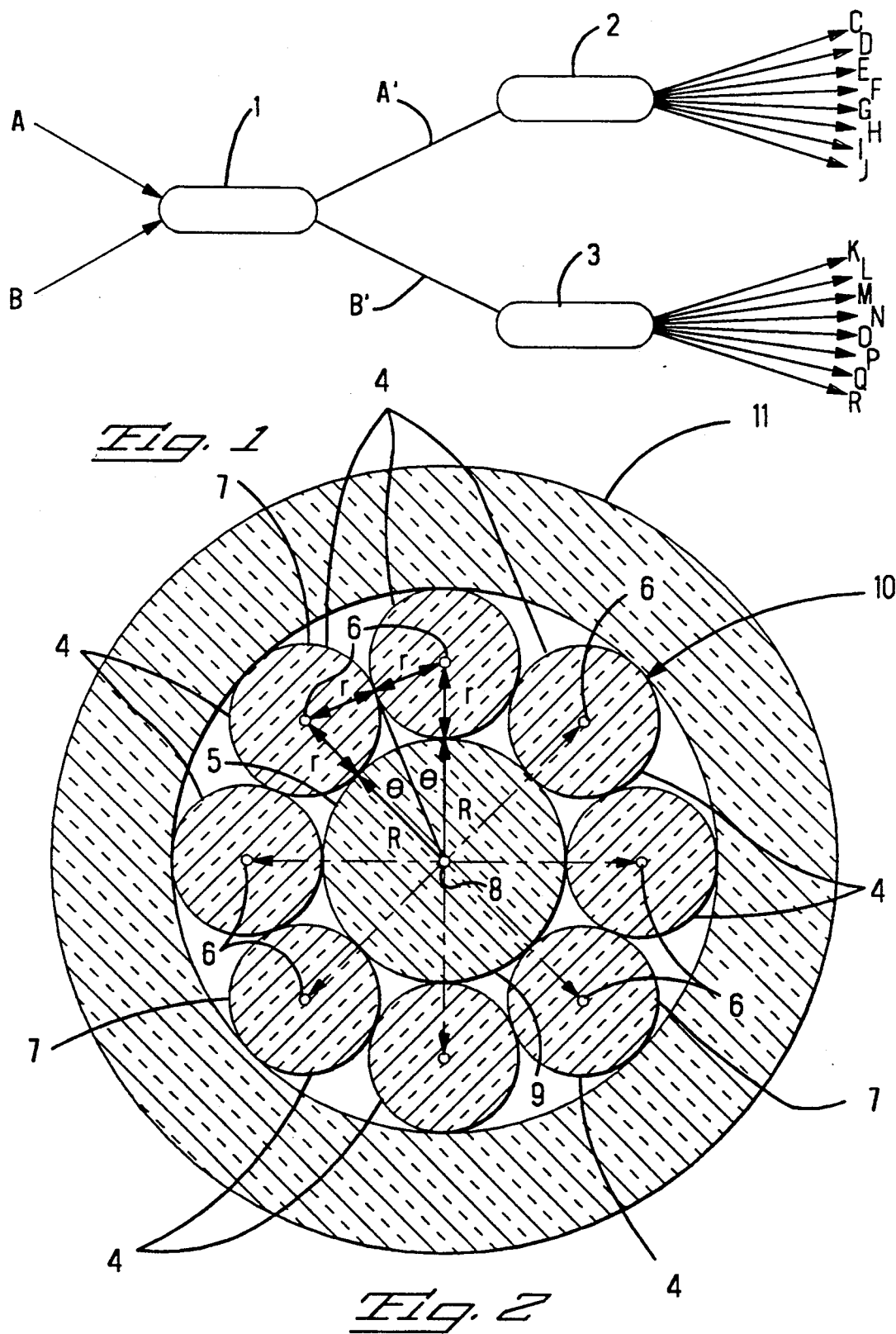
FIG. 1 is a schematic representation of a fiber optic distribution system utilizing optical fiber couplers.
FIG. 2 is a schematic representation of a cross section of a packed array of glass fibers with cores corresponding to one input port and eight output ports.

FIG. 1 shows a network for distributing optical signals as part of a multi terminal system such as that for distributing wideband signals among multiple subscribers. The network consists of one 2×2 coupler 1 having two input optical fibers for input ports A and B, and two output optical fibers A' and B'. Also, the optical fibers A' and B' comprise input optical fibers for corresponding, two 1×8 couplers 2, 3 having output optical fibers for output ports C, D, E, F, G, H, I, J, K, L, M, N, O, P, Q and R. The network of FIG. 1 is merely one of numerous network arrangements and multi terminal systems which may utilize the couplers of the present invention.

Figure 3:
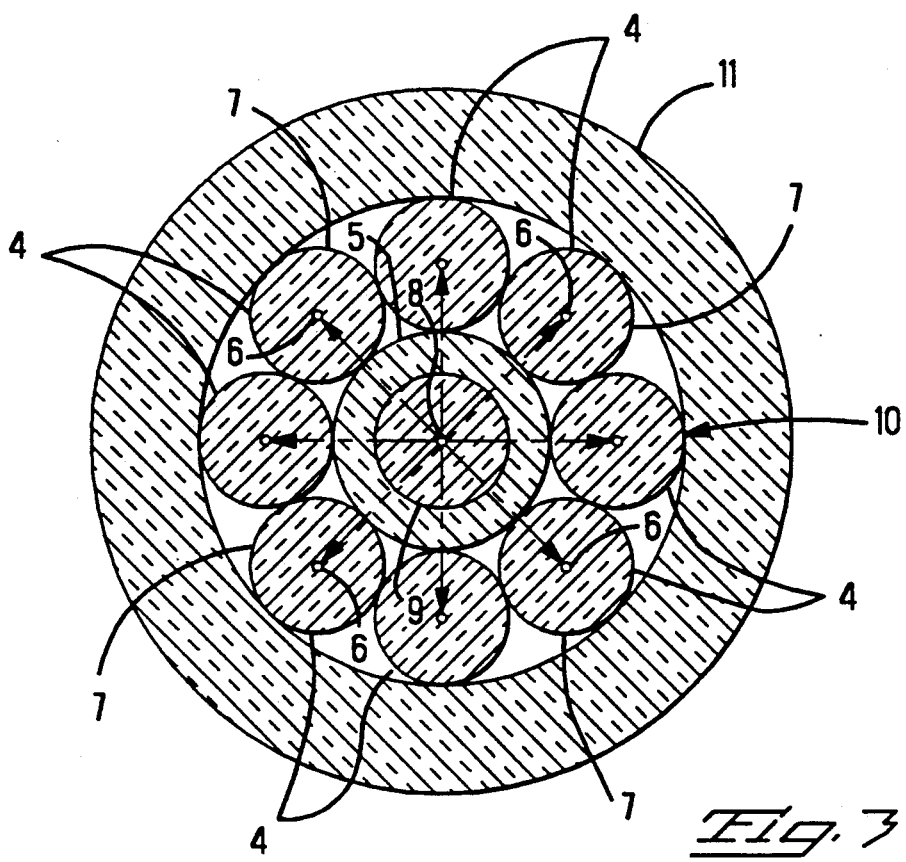
FIG. 3 is a schematic representation of a cross section of a packed array together with a central fiber encompassed by a glass sleeve.
Figure 4:
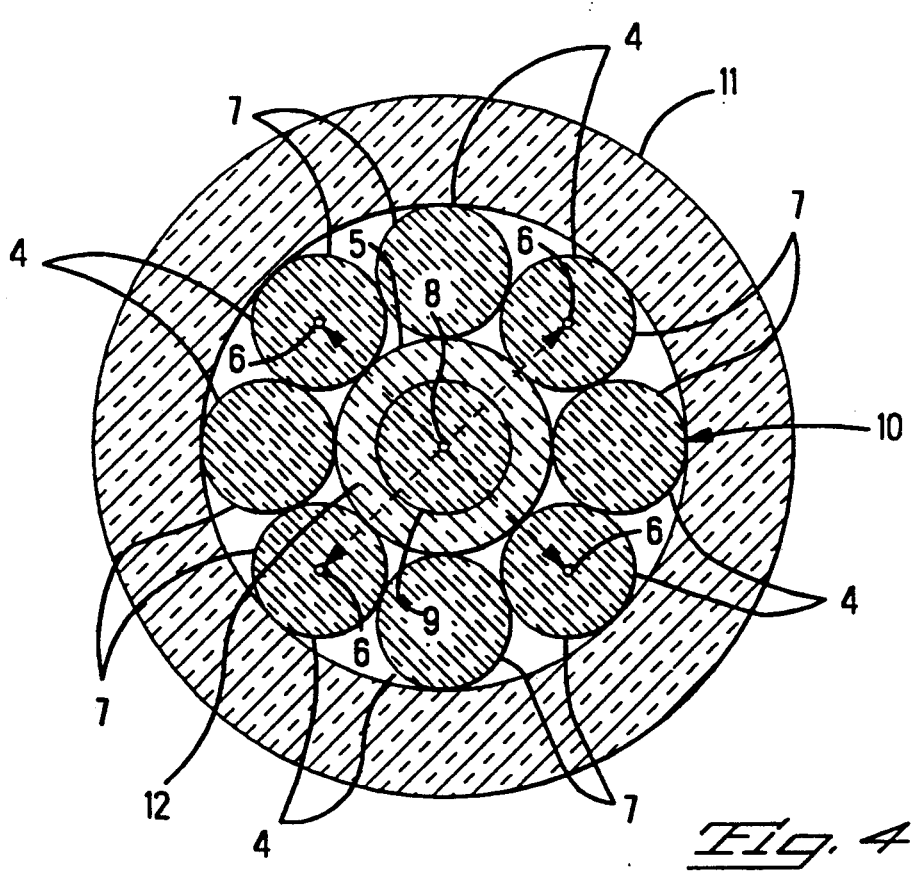
FIG. 4 is a schematic representation of a cross section of a packed array of glass fibers with cores corresponding to one input port and four output ports.

With reference to FIGS. 2, 3 and 4, each of the 1×8 couplers 2, 3 may be produced, for example, by a process of the present invention involving heating and fusing of a packed array 10 of glass fibers, with the fibers under tension, and optionally, twisting of the heated fibers to fuse them in a twisted configuration.

With reference to FIG. 2, there is shown eight glass fibers 4 of equal radius in a packed array 10 around a central, glass fiber 5. Each fiber 4 is a conventional optical fiber to the extent that each comprises a single mode optical fiber with a core 6 and cladding 7, and each is of the same, conventional and readily available size, for example, 125.00 micrometers in diameter.

The fiber 5 is a conventional, glass optical fiber to the extent that it comprises a single mode optical fiber with a core 8 and cladding 9. The material of cladding 7 and 9 is advantageously the same, meaning that the cladding 7 and 9 have the same index of refraction. It is noted that the fiber 5 is enlarged, by conventional glass manufacturing techniques, with an enlarged cladding 9, such that the central fiber 5 is of greater cross section than each of the outer fibers 4.

The fibers 4 are arranged around the central optical fiber 5 such that each fiber 4 is in contact with adjacent fibers 4 and in contact with the central fiber 5 to form a packed array 10 of the fibers 4, 5. Contact among the fibers 4, 5 is made possible by the enlarged diameter of the central fiber 5, according to the equation:

$$R = (M)(1 - \sin \theta)/\sin \theta$$

wherein;
"R" is the radius of the central fiber 5, and
"r" is the radius in common of the fibers 4, and
$\theta$ is $360°/2N$ and
N = the number of fibers 4 having a common radius dimension.

The angle Theta is shown in FIG. 2 as the angle intercepted between first and second lines, the first line extending from the centroid of the central fiber 5 tangent to adjacent fibers 4, and the second line extending from the centroid of the central fiber 5 to a centroid of either one of the adjacent outer fibers 4.

In one example, the surrounding optical fibers are eight in number, and are of equal radius "r", preferably a radius of 62.5 micrometers, available in a conventional optical fiber. The radius "R" of the central fiber is calculated to be 100.8 micrometers. Stated in another way, the radius "R" of the central fiber is equal to the radius "r", in common to each of the eight outer fibers, multiplied by 1.61.

With reference to FIG. 3, a packed array of glass fibers 4, 5 comprises, eight, single mode optical fibers 4 of equal radius radially spaced from and encircling a central optical fiber 5. Each fiber 4 is a conventional, single mode glass optical fiber with a core 6 and cladding 7. The central fiber 5 is a conventional optical fiber with a core 8 and cladding 9. The fiber 5 is enlarged to provide a radius "R" satisfying the above equation, by being encompassed within a glass sleeve 12 of cladding material with the same index as refraction as the material of cladding 7 and 9, instead of by enlarging the cladding 9, as disclosed previously with reference to FIG. 2.

In an example according to FIG. 3, the central fiber 5 may be selected from a conventional optical fiber with a radius of 62.5 micrometers, for example. Since the radius "R" is required to be greater than 62.5 micrometers, such fiber 5 is adapted with a surrounding, glass sleeve 12 to supplement the radial dimension of the fiber 5 to the required radius "R". The glass sleeve 12 intimately encompasses the central fiber 5, and becomes fused to the fiber 5 and the fibers 4 without voids, as explained in detail hereinafter.

With respect to the arrays 10 in each of FIGS. 2 and 3, each of the eight optical fibers 4 is an output fiber for a corresponding output port, C, D, E, F, G, H, J, I, K, L, M, N, O, P, Q, or R of FIG. 1. The central fiber 5 is an input fiber for an input port, or for an input fiber such as the input fibers A' or B' as shown in FIG. 1.

FIG. 4 represents a packed array 10, similar to that of FIG. 3, in that it comprises, a central fiber 5, eight outer glass fibers 4 with radii of equal dimension and a glass tube 11. The central fiber 5 is enlarged by a glass sleeve 12. The central fiber 5 can be enlarged, alternatively, by enlarging the cladding 9, as described in conjunction with FIG. 2. Four of the outer fibers 4 are without corresponding cores 6, and are comprised entirely of cladding 7, for example, a glass material comprising the cladding 7 of the four other, outer fibers 4. Such four other, outer fibers 4 are conventional optical fibers, in that they each have cores 6 and cladding 7. Each outer fiber 4 with a core 6 is adjacent to two outer fibers 4 without cores 6. The array 10 of FIG. 4 is suitable for a 1×4 coupler, having central fiber 5 providing an input of the coupler, and having four output fibers 4 with corresponding four cores 6 providing four outputs of the coupler. Such a coupler would have four output fibers 4 instead of the eight output fibers 4 depicted in the 1×8 couplers of FIG. 1.

With reference to FIGS. 5A and 5B, an array 10 of one input fiber 5 and eight output fibers 4, together with a surrounding glass tube 11, is depicted prior to fusing of the fibers 4 and 5. The number of output fibers 4 that have cores 6 is eight. However, the number of output fibers 4 having cores 6 can vary, as described previously. Forward ends of the fibers 4 extend shortly beyond a forward end of the tube 11. A rear end 16 of the fiber 5 extends shortly beyond the rear end of the tube 11. The fiber 5 of FIG. 5B is enlarged by a glass sleeve 12, but can be enlarged, alternatively, by enlarging the cladding 9, as described previously.

With reference to FIGS. 6A and 6B, the array 10 lo and tube 11 are fused together according to the following procedure. First the array 10 and the tube 11 are heated to a softened condition. Although the fibers 4 and 5 may fuse when softened, fusion is enhanced by drawing the fibers 4 and 5. Drawing is accomplished by applying tension to the array 10 and the tube 11, while the array 10 and the tube 11 are softened and heated. The fibers 4 and 5 are drawn into radially contracted, biconical tapered sections 13, 13 which are continuous from one section 13 to the other, as shown in FIG. 6A. The biconical sections 13, 13 define a fused coupling length, along which length, the fibers 4 and 5 are fused together without voids, as shown in FIG. 6B. The cladding 7 and 9 are fused together without voids. And the sleeve 12, if present in the array 10, also is fused to the cladding 7 and 9 without voids. The tube 11 is fused to the cladding 7 of the fibers 4, and provides strength to the reduced radial sections 13, 13. The tube 11 further compacts the fibers 4 and 5 tightly together in the packed array 10. The tube 11 is made of Vycor having a lower index of refraction than the cladding 7 and 9, and thus serves to confine optical power in the biconical sections 13, 13.

The cores 6 and 8 remain spaced apart radially along the coupling length in the same proportional spacing as they were spaced apart radially in the array 10 prior to drawing. Further to enhance fusion of the fibers 4 and 5, the fibers 4 and 5 are subjected to optional twisting along the coupling length, as disclosed in U.S. Pat. No. 4,291,940. According to a known phenomenon, optical power transmitted by the input fiber 5 is coupled progressively to the output fibers 4 along the coupling length. The coupling length is determined, by monitoring the optical power from the output fibers 4, to provide complete coupling of the power from the fiber 5 to the fibers 4. A uniform distribution of the coupled power among the output fibers 4 is achieved by maintaining the same radial proportional spacing of the cores 6 with respect to the core 8. Further, the coupling length corresponds to that length of optical coupling in which optical power being transmitted along the central fiber 5 is coupled completely and distributed uniformly from the central fiber 5 to the output fibers 4, and said coupling length being shorter than such a length of optical coupling along which the optical power is coupled, in return, to the central fiber 5.

It should be understood that the invention is to be limited only by the spirit and scope of the following claims.

We claim:

1. A coupler comprising:
   a central in put optical fiber radically surrounded uniformly by N number of fibers, output optical fibers of the N number of fibers having optical cores uniformly surrounded by optical cladding, the N number of fibers having radii "r" of the central optical fiber is determined by the equation:

$$R=(r)(1-\sin\theta/\sin\theta$$

wherein $\theta$ is 360°/2N, and the central optical fiber and the N number of fibers being optically fused together radially along an optical coupling length corresponding to that coupling length along which optical power transmitted by the central optical fiber is coupled completely and distributed uniformly radially to the output optical fibers having the optical cores proportionately spaced the same from an optical core of the central optical fiber.

2. A coupler as recited in claim 1, and comprising:
   a tube encompassing the N number of fibers at least along the coupling length.

3. A coupler as recited in claim 1, wherein, each of all the fibers along the coupling length is reduced in cross section, and a tube covers all the fibers and is fused thereto along the coupling length.

4. A coupler as recited in claim 1, wherein, all the fibers are fused together radially along a biconical tapered section.

5. A coupler as recited in claim 1, wherein, the N number of fibers includes fibers without corresponding optical cores, and each of, at least one, remaining N number of fibers includes an optical core corresponding to one output.

6. A coupler as recited in claim 1, wherein, the central optical fiber is enlarged by an enlarged cladding material.

7. A coupler as recited in claim 1, wherein, the central optical fiber is enlarged by a sleeve of cladding material.

8. A coupler as recited in claim 1, wherein, the fused coupling length is shorter than that coupling length along which optical power is coupled in return to the central optical fiber.

9. A method of making an optical fiber coupler comprising the steps of:
   providing N number of fibers having radii "r" of equal dimensions;
   providing a central input optical fiber having a radius "R", the radius "R" determined by the equation:

$$R=(r)(1-\sin\theta/\sin\theta$$

wherein $\theta$ is 360°/2N;
   surrounding said central input optical fiber by said N number of glass fibers, wherein output optical fibers of the N number of fibers have optical cores uniformly surrounded by optical cladding;
   fusing together optically the central optical fiber and the N number of fibers radially along an optical coupling length corresponding to that coupling length along which optical power transmitted by the central optical fiber is coupled completely and distributed uniformly to the output optical fibers having the optical cores proportionately spaced the same from an optical core of the central optical fiber.

10. A method as recited in claim 9, and further comprising the step of: enlarging the central fiber with cladding material prior to being surrounded with the N number of fibers.

11. A method as recited in claim 9, and further comprising the steps of:
surrounding the N number of fibers with a glass tube, and fusing together the tube and all of the fibers.

12. An array of optical fibers in a tube for producing an optical coupler, comprising:
a central single mode optical fiber, N number of glass fibers of equal radii "r" surrounding and packed together with the central optical fiber, each output optical fiber of the N number of fibers is provided by a corresponding optical core surrounded by optical cladding, a tube encompassing all the fibers, and a radius "R" of the central fiber is determined by
[R = (r)(1 − sine Theta)/(sine Theta), wherein Theta is 360 degrees/2N]

$$R = (r)(1 - \sin \theta / \sin \theta$$

wherein $\theta = 260°/2N$.

13. An array as recited in claim 12, wherein, the N number of fibers includes fibers without corresponding optical cores, and each of, at least one, remaining N number of fibers includes an optical core corresponding to one output.

14. An array as recited in claim 12, wherein, N equals 8, and "R" is determined as "r" times 1.61.

15. An array as recited in claim 12, wherein, output optical fibers of the N number of fibers have optical cores surrounded by optical cladding.

16. An array as recited in claim 12, wherein, output optical fibers of the N number of fibers have optical cores surrounded by optical cladding.

* * * * *

UNITED STATES PATENT AND TRADEMARK OFFICE
CERTIFICATE OF CORRECTION

PATENT NO. : 5,175,782

DATED : December 29, 1992

INVENTOR(S) : Terry Patrick Bowen, et al.

It is certified that error appears in the above-identified patent and that said Letters Patent is hereby corrected as shown below:

Claim 1, Column 6, Line 11 - replace the word "radically" with the word -- radially --.

Claim 12, Column 8, Line 8 - replace the figure "260°" with the figure -- 360° --.

Signed and Sealed this

Eighteenth Day of January, 1994

Attest:

BRUCE LEHMAN

Attesting Officer

Commissioner of Patents and Trademarks